United States Patent
Dalton et al.

(10) Patent No.: US 9,291,397 B2
(45) Date of Patent: Mar. 22, 2016

(54) LIQUID DISTRIBUTION SYSTEM FOR A FLUID COOLER

(71) Applicant: SPX Cooling Technologies, Inc., Overland Park, KS (US)

(72) Inventors: John Dalton, Platte Woods, MO (US); Jason Stratman, Lees Summit, MO (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 142 days.

(21) Appl. No.: 14/175,504

(22) Filed: Feb. 7, 2014

(65) Prior Publication Data

US 2015/0226491 A1    Aug. 13, 2015

(51) Int. Cl.
*B01F 3/04* (2006.01)
*F28D 5/02* (2006.01)

(52) U.S. Cl.
CPC ............... *F28D 5/02* (2013.01); *B01F 3/0446* (2013.01); *B01F 3/04439* (2013.01); *B01F 2215/008* (2013.01)

(58) Field of Classification Search
CPC ............ B01F 3/0446; B01F 3/04439; B01F 2215/008; F28D 5/02
USPC ............. 261/28, 30, 97, 110, 112.1, DIG. 11
See application file for complete search history.

(56) References Cited

U.S. PATENT DOCUMENTS

| | | | | |
|---|---|---|---|---|
| 4,112,027 A * | 9/1978 | Cates | .................. | F28D 5/02 165/900 |
| 4,514,202 A | 4/1985 | Kinney, Jr. et al. | | |
| 4,548,766 A | 10/1985 | Kinney, Jr. et al. | | |
| 4,755,331 A * | 7/1988 | Merrill | .................. | F28D 5/02 165/172 |
| 5,427,718 A * | 6/1995 | Phelps | .................. | B01J 19/32 261/109 |
| 6,598,862 B2 * | 7/2003 | Merrill | .................. | F24F 5/0035 261/128 |
| 7,232,116 B2 * | 6/2007 | Stratman | .................. | F28C 1/14 261/112.1 |
| 7,275,735 B2 * | 10/2007 | Brenneke | .................. | F04D 25/166 261/30 |
| 7,364,141 B2 * | 4/2008 | Brenneke | .................. | F28C 1/14 261/112.1 |
| 7,603,774 B2 * | 10/2009 | Facius | .................. | F28C 1/14 261/153 |
| 7,887,030 B2 * | 2/2011 | Hentschel | .................. | F28C 1/04 165/900 |
| 8,434,746 B2 * | 5/2013 | Carter | .................. | F28C 1/14 261/155 |

* cited by examiner

*Primary Examiner* — Charles Bushey
(74) *Attorney, Agent, or Firm* — Baker & Hostetler LLP

(57) ABSTRACT

A cooling tower system and/or fluid cooler that provides desired cooling performance, without the use of pressurized or gravity based nozzle spray systems.

20 Claims, 3 Drawing Sheets

LIQUID DISTRIBUTION SYSTEM FOR A FLUID COOLER

FIELD OF THE INVENTION

The present invention relates generally to fluid cooling devices, and more particularly relates in some aspects to a combination cooling apparatus that includes a closed loop coil heat exchanger section together with an evaporative water cooler section. The invention specifically pertains to a liquid distribution system for use with cooling tower apparatus.

BACKGROUND OF THE INVENTION

Many cooling devices are in wide use throughout industry. Some of these devices are referred to as "fluid coolers" and are used to cool and return fluid from devices such as water source heat pumps, chillers, cooling jackets, or other systems that produce relatively hot water and require the return of relatively cooler water. Such cooling devices include different types such as closed looped systems, which often feature a serpentine heat exchange coil, and open loop or evaporative systems, which pass the water through fill media such as a sheet pack or over a series of splash bars before collecting the water in a basin.

One particularly advantageous arrangement combines these two features, such as for example the arrangement described in U.S. Pat. No. 4,112,027, the disclosure of which is hereby incorporated by reference in its entirety. This patent describes a high efficiency, induced draft, combination counter-flow-crossflow fluid cooling apparatus and method which gives unexpectedly enhanced cooling of hot fluid by causing the fluid to pass upwardly through a series of serpentine heat exchange conduits in primarily countercurrent, indirect sensible heat exchange relationship with external cooling water gravitating from an overlying evaporative water cooling section. Cross-flowing air currents are pulled through the apparatus to evaporatively cool the water not only in the upper cooling section but also in the sensible heat exchange area as well. Countercurrent flow of coolant water and fluid to be collected ensures that the coldest water and coldest fluid are in thermal interchange during the final stages of fluid cooling at the upper ends of the heat exchange conduits, so that the fluid temperature can approach that of the cold water as opposed to approaching the temperature of heated water found adjacent the lower ends of the conduits, which is conventional in concurrent fluid units of this type. The fluid conduit system is preferably arranged for causing increased fluid residence time, and thereby greatest temperature difference and longer heat exchange between the fluid and coolant water adjacent the air inlet of the apparatus where air and coolant water temperatures are lowest relative to the fluid to be cooled, so that an ideal countercurrent flow relationship is obtained and maximum heat transfer is assured. An underlying water collection basin is also employed in the apparatus which is constructed to permit collection of cooling water to a level above that of the lowermost portions of the hot fluid conduits, in order to allow the hot fluid traveling through the conduits to heat the collected water to prevent freezing thereof during wintertime operations when the internal water pump is shut down causing the stoppage of the evaporative cooling and hence a raising of the lower water basin level.

The above described system, while providing excellent performance, can still be improved upon. In, particular an alternative spray system design has been developed that does not require pressurized or gravity based nozzle sprays systems. The invention described in detail herein accordingly offers an alternative to the above mentioned systems to uniformly distribute water in a fluid cooler or the like.

In view of the foregoing, it would be desirable to have a cooling tower and/fluid cooler that provides desired cooling performance, without the use of pressurized or gravity based nozzle spray systems.

SUMMARY OF THE INVENTION

The foregoing needs are met, to a great extent, by the present invention, wherein in one aspect an apparatus is provided that in some embodiments a cooling tower system and/or fluid cooler that provides desired cooling performance, without the use of pressurized or gravity based nozzle spray systems.

In one embodiment of the present invention, a cooling tower apparatus that extends along a vertical axis, is provided comprising; a first fill media disposed at a first position along the vertical axis; a first louver that extends across a horizontal plane normal to the vertical axis at a second position along the vertical axis, below said first position; a second fill media disposed at a third position along the vertical axis below said louver; a supply of cooling water to the first fill media; a closed circuit heat exchanger disposed at a fourth position along the vertical axis below the second fill media.

In yet another embodiment of the present invention, a cooling tower extending along a vertical axis is provided, comprising: a frame assembly having an internal space with two sides defining its width and an upper side air inlet and a lower side air inlet and a top air outlet; a first evaporative fill media having a first air path from the upper side air inlet through the fill media to the top air outlet; a first louver positioned across a horizontal plane normal to the vertical axis at a second position along the vertical axis, below said first position; a second fill media disposed at a third position along the vertical axis below said louver; a supply of cooling water to the first fill media; and a closed circuit heat exchanger disposed below the louver having a second air path from the lower side air inlet through the exchanger to the top air outlet.

In still another embodiment of the present invention, a method cooling a fluid is provided, comprising: flowing cooling water over a first fill media disposed at a first position along a vertical axis, wherein said first fill media has a first end and a second end; flowing said cooling water over a first louver positioned at the second end extending across a horizontal plane normal to the vertical axis at a second position along the vertical axis, below said first position; flowing said cooling water through a second fill media disposed at a third position along the vertical axis below said louver; and flowing said cooling water over a closed circuit heat exchanger disposed at a fourth position along the vertical axis below the second fill media; and passing air through said first fill media and said second fill media.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

In various embodiments, a cooling tower and/or a water distribution system are provided which enhance cooling performance and allow for the exchange of heat between fluids without the use of pressurized or gravity based nozzle spray systems.

Figure 1:
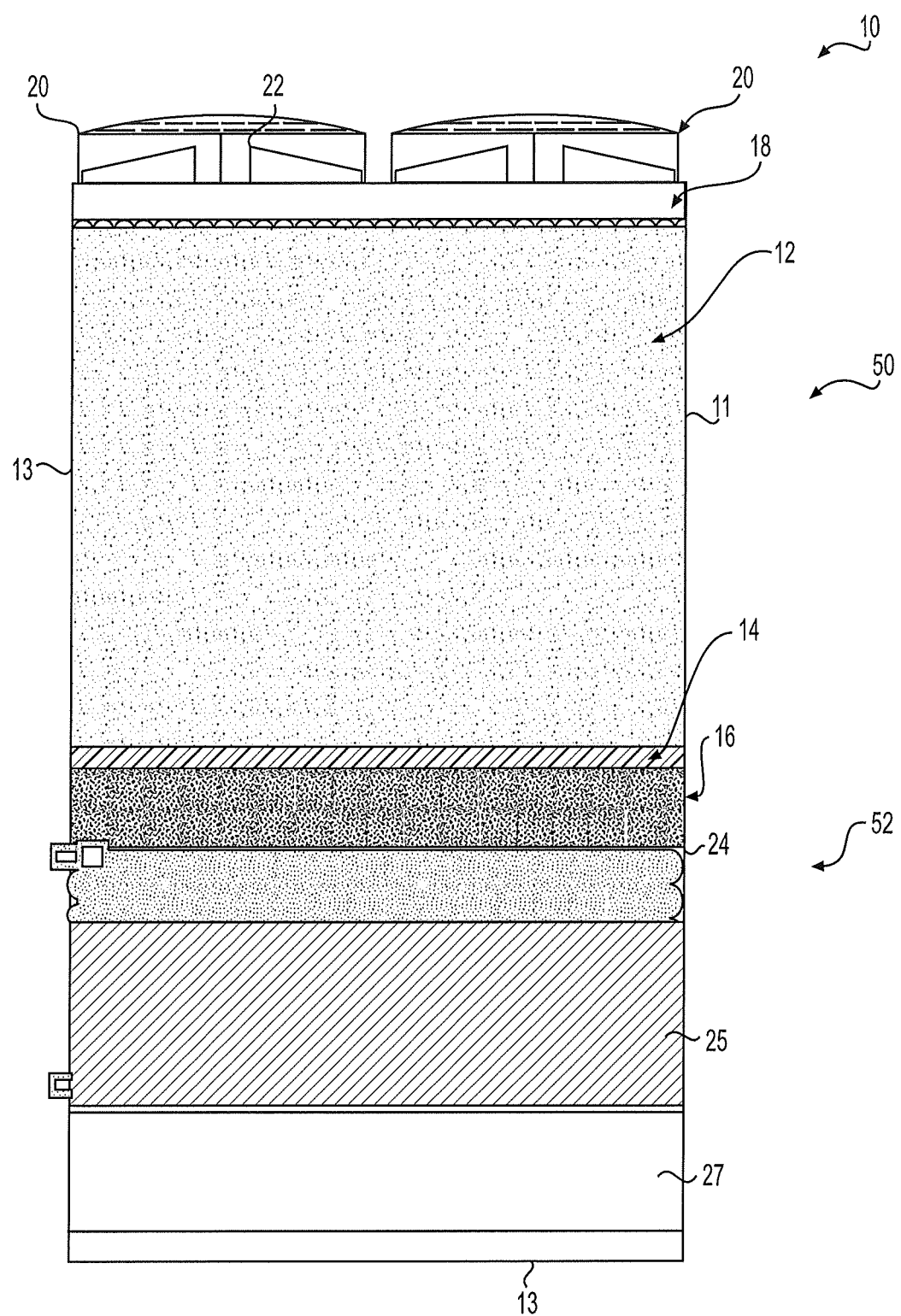
FIG. 1 is a side or end view of a cooling tower according to a preferred embodiment of the present invention.

Some preferred embodiments of the invention will now be described with reference to the drawing figures, in which like reference numerals refer to like elements throughout. Turning to FIG. 1, a cooling tower generally illustrated 10 is shown having a frame 11 and a base 13. The frame 11 surrounds and encloses an upper fill media 12. This upper fill media material 12 is of the cross-flow type and may preferably be an evaporative fill material. Specifically, the fill media 12 may more preferably be a film type fill pack comprised of a number of thin fill sheets, with each fill sheet having features such as for example ribs, spacers, and/or integral louvers and eliminators.

As illustrated in FIG. 1, the cooling tower 10 has a region or area 14 wherein louvers or slats 14 extend along a horizontal plain, separating the fill media 12 from the diffuser section 16. Generally speaking, the diffuser section 16 preferably comprises fill media similar to the fill sheets described in U.S. Pat. No. 4,548,766, the disclosure of which, is hereby incorporated by reference in its entirety.

As further depicted in FIG. 1, the space or region immediately below the diffuser section 16 includes a lower serpentine conduit heat exchanger arrangement 24. The lower serpentine heat exchanger arrangement 24 may however be any type of, closed loop, fluid cooling arrangement such as for example, a parallel system having a number of parallel horizontal circuits arranged in vertical coil rows. The coils may be useful to cool any fluids, but may be typically used to cool water, water/glycol mixtures, oil or other fluids, particularly those fluids utilized in industrial processes. This written description refers to "cooling water" to indicate the recirculated liquid that falls through the fill media 12 and/or in contact with the air and which then falls over the lower heat exchanger 24. The word "fluid" will be used to refer to the liquid being cooled by traveling inside the lower heat exchanger 24. Of course one or both liquids may or may not be water.

Referring back to FIG. 1, the cooling tower 10 includes an upper distribution basin 18, a series of fan cylinders or shrouds 20 and fans 22 which are disposed in each fan cylinder 20. As the name suggests, the upper distribution basin 18 sprays or distributes cool water onto and through the upper fill material 12. The cooling water, which is relatively warm at this point, has its temperature reduced by passing through the upper fill material 12, due to a number of effects including contact with air and evaporation. This water, which is now relatively cooler, drops from the bottom of the upper fill material 12 where it contacts the louver or slat region 14.

The louver or slat region 14 is preferably composed of louvers or slats that are positioned at various angles beneath the upper fill material 12 to spread the water exiting the upper fill media 12 over an area that differs from the fill media 12. The water then exits the louver or slat region 14, where it contacts the water diffuser 16 where the diffuser evenly redistributes the cooling water onto the lower heat exchanger 24.

The cooling water thereby passes over the lower heat exchanger 24, thereby cooling the fluid being cooled by the lower heat exchanger 24. The cooling water, after it passes through the lower heat exchanger 24, then falls into a lower collection basin 27, from which it is recirculated by a pump back up through a supply tube and into the upper distribution basin 18.

As previously identified, two fans 22 are provided at the top of the cooling tower 10 to provide a cross-flow air draw over both the upper fill material 12 via the upper air inlet 50 and the lower heat exchanger 24 via the lower air inlet 52 as will be described in more detail below. The upper air inlet 50 provides for the ingress of air into the cooling tower 10 to be exposed to the upper evaporative fill 12 while the lower air inlet 52 provides an inlet for air into the cooling tower 10 such that it passes over the lower heat exchanger coil unit 24. The fluid to be cooled is provided via one or more inlets 40 to the lower heater exchanger 16 and after it is cooled is outlet through one or more outlets 34 from the lower heat exchanger. A drift eliminator 30 and sidewall barrier 32 are provided on the interior adjacent the side of the lower heat exchanger 24 and will be described in further detail below.

Figure 2:
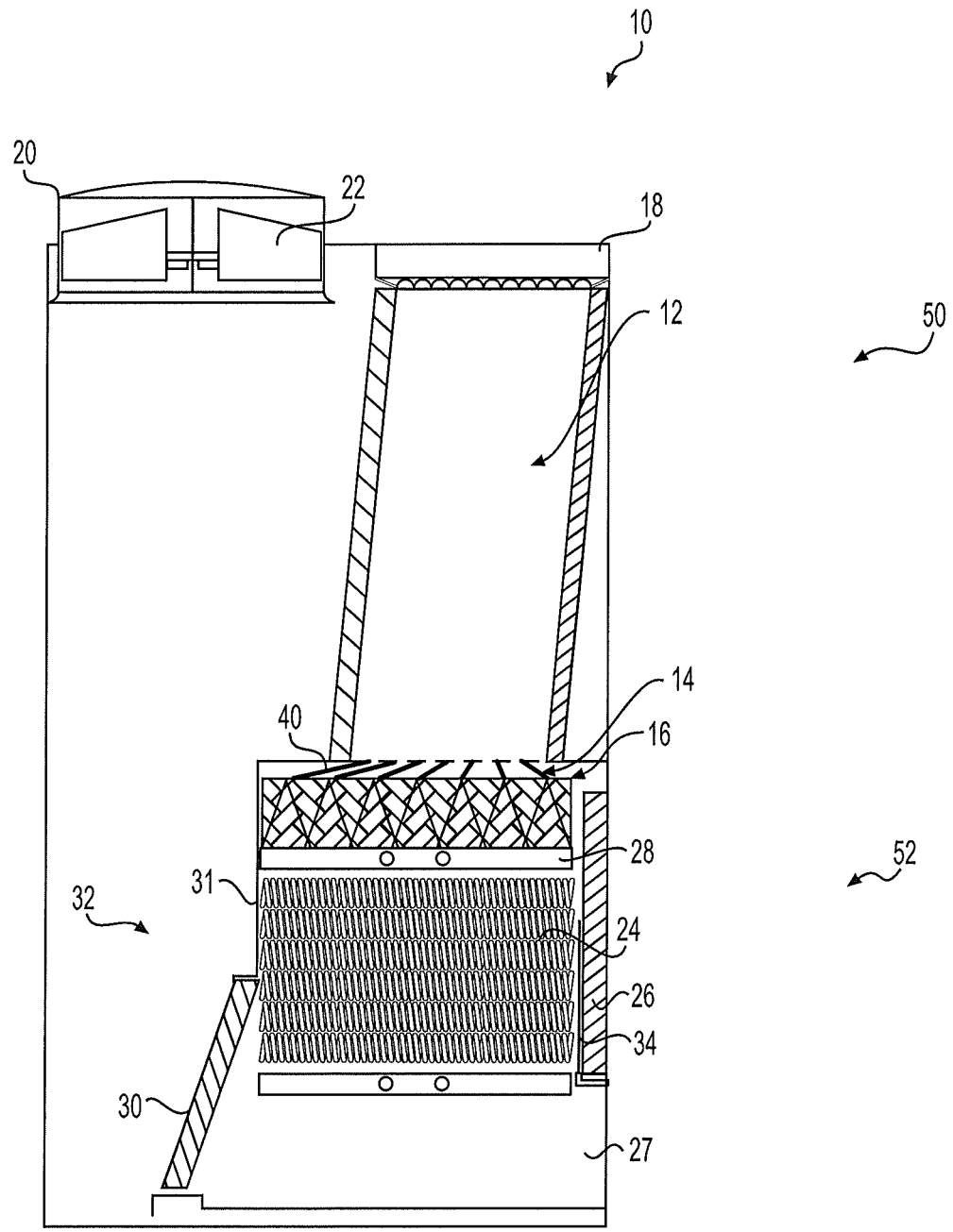
FIG. 2 is another side view of the cooling tower of FIG. 1.

As illustrated in FIGS. 1 and 2, the overall operation of the cooling tower 10 can be seen in more detail. In particular, the fans 22 provide a pressure differential drawing air through the respective inlets 50, 52, upward and out of the cooling tower 10. Thus, in the upper portion of the cooling tower, air is drawn into the frame assembly 11 via the inlet 50 and passes across the upper fill media 12, before exiting the fill media 12 and being drawn upward and outward from the tower 10. The relatively warm cooling water which is pumped into the upper water distribution basin 18, exits through a series of perforations or holes and falls over the upper evaporative fill media 12 where it is cooled. The cooled water exits the cross fill media 12 and engages the louvers or slats 14 wherein the louvers or slats 14 spread the water over an area that differs from the fill media 12 as previously discussed. The water then exits the louver or slat region 14, where it contacts the water diffuser 16 where it evenly redistributes the cooling water onto the lower heat exchanger 24, also as previously discussed.

The relatively cool re-circulating cooling water then passes over the lower heat exchanger 24, picking up heat while doing so, and falls into the lower collection basin 27, from which it is re-circulated by a pump.

As illustrated in FIG. 2, the lower heat exchanger 24 has an air outlet side generally designated 32 having a side wall barrier or baffle 31, and a drift eliminator 30. This provides several advantageous benefits, including causing the air to not only cross-flow across the coils but actually have a somewhat downward component. The bottom of the coils of the lower heater exchanger 24, are spaced above the lower basin 27 so that some air can pass thereunder and then upward through the drift eliminator 30. It has been found that positioning the drift eliminator 30 at an angle of at approximately 15 to 45 degrees from vertical, and more preferably 30 degrees, can be very advantageous in this exemplary type of arrangement. In particular, the angled orientation of the eliminator helps "turn" the air flow separately so that it does not "crash" into the back wall. This separating of the air flow makes the pressure drop of the system and hence the fan power needed. The structure of the drift eliminator 40 itself otherwise may preferably be similar to the cellular drift eliminator design described in U.S. Pat. No. 4,514,202, the disclosure of which is hereby incorporated by reference in its entirety.

Figure 3:
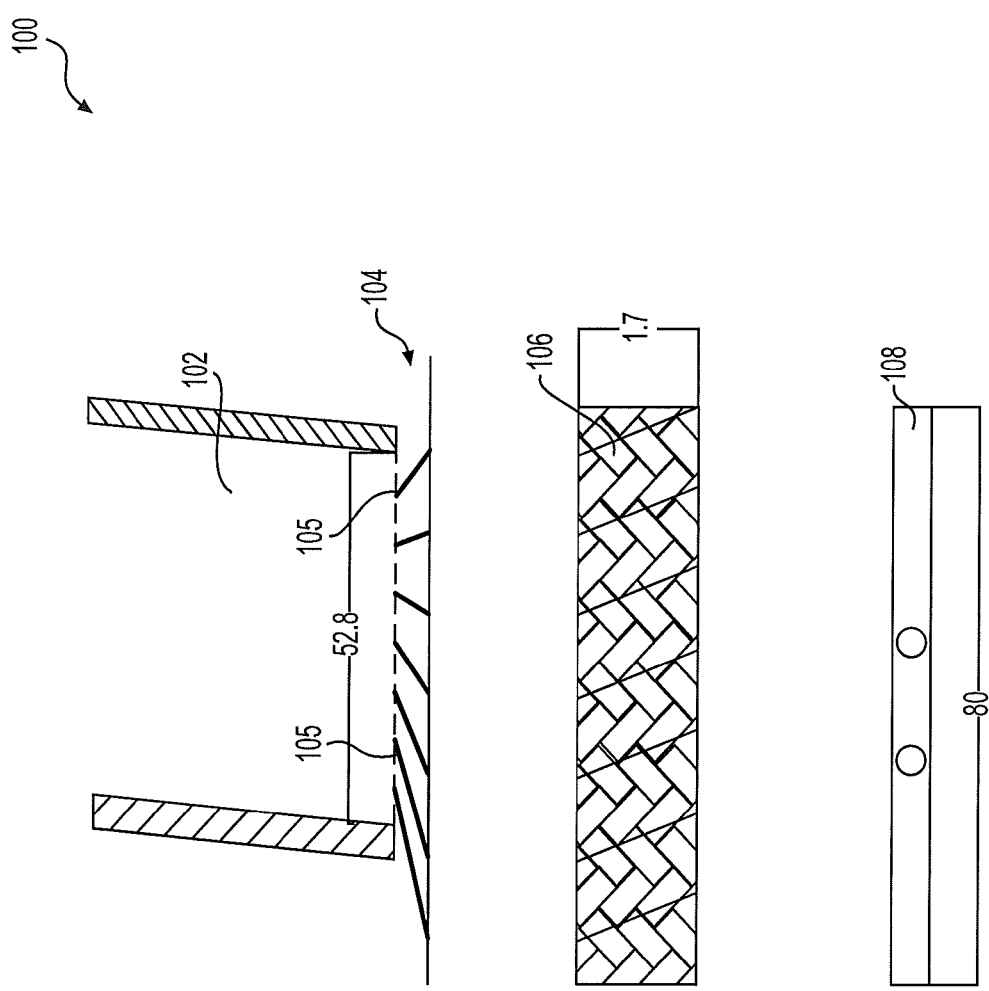
FIG. 3 is a detailed illustration of a liquid distribution system employed in a fluid cooler or cooling tower in accordance with an embodiment of the present invention.

Turning now to FIG. 3, an expanded exploded view of the lower portion of the tower, generally 100, is depicted. Generally speaking, the angles of the louvers and eliminators have been chosen to keep water in the heat transfer packing, minimize the parasitic pressure loss, and aid in turning the air towards the fan. Specifically, the louver region 104 is illustrated below the upper fill 102. As depicted in FIG. 3, the louver region consists of a series of individual louvers or slats equally spaced apart wherein the louvers 105 are positioned at varying angles to horizontal. While in one preferred embodiment the louvers or slats are equally spaced, another embodiment of the present invention employs louvers or slats that may not be equally spaced depending upon application.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cooling tower apparatus that extends along a vertical axis, comprising;
    a first fill media disposed at a first position along the vertical axis;
    a first louver that extends across a horizontal plane normal to the vertical axis at a second position along the vertical axis, below said first position;
    a second fill media disposed at a third position along the vertical axis below said louver;
    a supply of cooling re-circulating water to the first fill media;
    a closed circuit heat exchanger disposed at a fourth position along the vertical axis below the second fill media.

2. The cooling tower according to claim 1, wherein said first fill media is cross flow media.

3. The cooling tower according to claim 2, wherein said second fill media is cross flow media.

4. The cooling tower according to claim 1 further comprising a second louver that extends across the horizontal plane normal to the vertical axis at a second position along the vertical axis, below said first position.

5. The cooling tower according to claim 4, further comprising a third louver that extends across the horizontal plane normal to the vertical axis at a second position along the vertical axis, below said first position.

6. The cooling tower according to claim 5, wherein the first louver is positioned at an angle equal to approximately 37 degrees to the horizontal plane; the second louver is positioned at an angle equal to approximately 121 degrees to the horizontal plane; and the third louver is positioned at an angle equal to approximately 158 degrees to the horizontal plane.

7. The cooling tower according to claim 1, wherein said first louver is a plurality of louvers.

8. The apparatus according to claim 1, further comprising an upper water distribution basin that distributes cooling water onto the first fill media.

9. The apparatus according to claim 1, further comprising a lower collection basin that receives cooling water from the heat exchanger.

10. The apparatus according to claim 1, further comprising a drift eliminator disposed adjacent the heat exchanger.

11. A cooling tower extending along a vertical axis, comprising:
    a frame assembly having an internal space with two sides defining its width and an upper side air inlet and a lower side air inlet and a top air outlet;
    a first evaporative fill media having a first air path from the upper side air inlet through the fill media to the top air outlet;
    a first louver positioned across a horizontal plane normal to the vertical axis at a second position along the vertical axis, below said first position;
    a second fill media disposed at a third position along the vertical axis below said louver;
    a supply of cooling re-circulating water to the first fill media; and
    a closed circuit heat exchanger disposed below the louver having a second air path from the lower side air inlet through the exchanger to the top air outlet.

12. The cooling tower according to claim 11, further comprising a baffle disposed in between the second fill media and the heat exchanger that at least substantially separates the first and second air paths from each other said baffle.

13. The cooling tower according to claim 12, further comprising an air drift eliminator disposed adjacent the heat exchanger.

14. The cooling tower according to claim 11, wherein said first fill media is cross flow media.

15. The cooling tower according to claim 14, wherein said second fill media is cross flow media.

16. The cooling tower according to claim 11, further comprising a second louver positioned at the second end extending across the horizontal plane normal to the vertical axis at a second position along the vertical axis, below said first position.

17. The cooling tower according to claim 16, further comprising a third louver positioned at the second end extending across the horizontal plane normal to the vertical axis at a second position along the vertical axis, below said first position.

18. The cooling tower according to claim 17, wherein the first louver; the second louver; and the third louver are each equally spaced apart from one another.

19. The cooling tower according to claim 1, wherein said first louver is a plurality of louvers.

20. A method cooling a fluid, comprising:
    flowing cooling water over a first fill media disposed at a first position along a vertical axis, wherein said first fill media has a first end and a second end;
    flowing said cooling water over a first louver positioned at the second end extending across a horizontal plane normal to the vertical axis at a second position along the vertical axis, below said first position;

flowing said cooling water through a second fill media disposed at a third position along the vertical axis below said louver; and flowing said cooling water over a closed circuit heat exchanger disposed at a fourth position along the vertical axis below the second fill media; and passing air through said first fill media and said second fill media.

* * * * *